United States Patent
Wakayama et al.

(10) Patent No.: US 9,485,032 B2
(45) Date of Patent: Nov. 1, 2016

(54) OPTICAL MULTILEVEL TRANSMITTER AND OPTICAL TRANSPONDER

(71) Applicant: Hitachi, Ltd., Chiyoda-ku, Tokyo (JP)

(72) Inventors: Yuki Wakayama, Tokyo (JP); Nobuhiko Kikuchi, Tokyo (JP)

(73) Assignee: Hitachi, Ltd., Tokyo (JP)

(*) Notice: Subject to any disclaimer, the term of this patent is extended or adjusted under 35 U.S.C. 154(b) by 0 days.

(21) Appl. No.: 14/530,571

(22) Filed: Oct. 31, 2014

(65) Prior Publication Data

US 2015/0117869 A1    Apr. 30, 2015

(30) Foreign Application Priority Data

Oct. 31, 2013   (JP) ................. 2013-226987

(51) Int. Cl.
    *H04B 10/588*    (2013.01)
    *H04B 10/50*    (2013.01)

(52) U.S. Cl.
    CPC ........ *H04B 10/588* (2013.01); *H04B 10/5053* (2013.01); *H04B 10/5055* (2013.01)

(58) Field of Classification Search
    CPC ............ H04B 10/588; H04B 10/5053; H04B 10/5055; H04B 398/189; H04B 389/193
    See application file for complete search history.

(56) References Cited

U.S. PATENT DOCUMENTS 8,897,655 B2* 11/2014 Essiambre ............ H04L 27/06
    375/261
2006/0263097 A1* 11/2006 Akiyama ............. H04B 10/505
    398/188
2008/0019703 A1* 1/2008 Burchfiel ............. H04B 10/505
    398/183
2013/0223849 A1* 8/2013 Whiteaway ........... H04L 27/364
    398/141

FOREIGN PATENT DOCUMENTS

| FR | EP 634934 A1 * | 9/2013 | ......... H04B 10/2507 |
|---|---|---|---|
| JP | 2007-006326 A | 1/2007 | |
| JP | 2008-172714 A | 7/2008 | |
| JP | 2011-022390 A | 2/2011 | |
| JP | 2013-026758 A | 2/2013 | |

OTHER PUBLICATIONS

R.A. Griffin, et al. "10Gb/s Optical Differential Quadrature Phase Shift Key (DQPSK) Transmission using GaAs/AlGaAs Integration, " OFC2002, paper PD-FD6, 2002.
P.J. Winzer, Spectrally Efficient Long-Haul Optical Networking Using 112-Gb/s Polarization-Multiplexed 16-QAM, Jouranal of Lightwave Technology, vol. 28, No. 4, Feb. 15, 2010, pp. 547-556.
E. Yamada, et.al., "112-Gb/s In PDP-QPSK modulator integrated with a silica-PLC polarization multiplexing circuit", OFC 2012, PDP5A.9 (2012).

* cited by examiner

*Primary Examiner* — Leslie Pascal
(74) *Attorney, Agent, or Firm* — Miles & Stockbridge P.C.

(57) ABSTRACT

An optical multilevel transmitter includes a semiconductor quadrature optical modulator configured to separately modulate and output in-phase and quadrature electric field components and a semiconductor nonlinear characteristic compensation circuit configured to generate, from in-phase and quadrature drive signals to be inputted to the semiconductor quadrature optical modulator, two signals for correcting each other and to add the two correcting signals to the corresponding drive signals.

8 Claims, 9 Drawing Sheets

DEFINITION OF
AMPLITUDE AND PHASE

QUADRATURE PHASE
SHIFT KEYING SIGNAL(QPSK)

16QAM SIGNAL

64QAM SIGNAL

F I G. 7
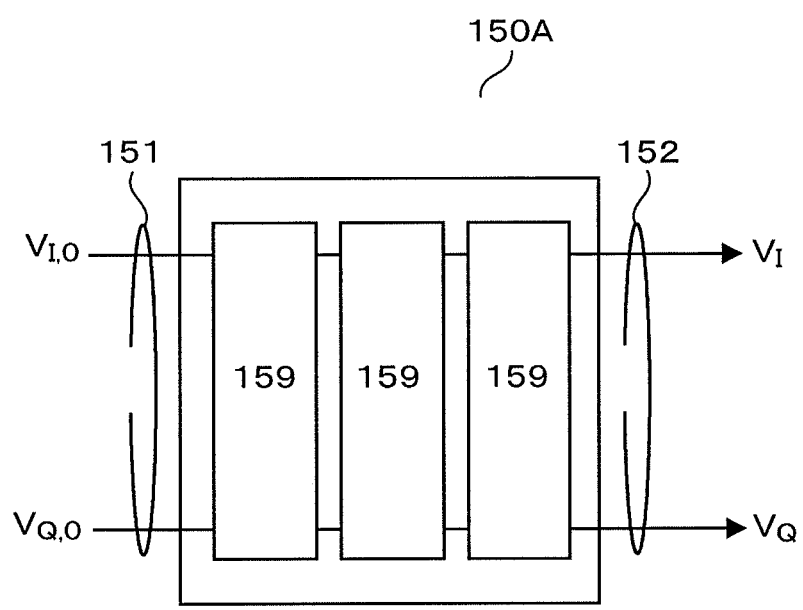

F I G. 8
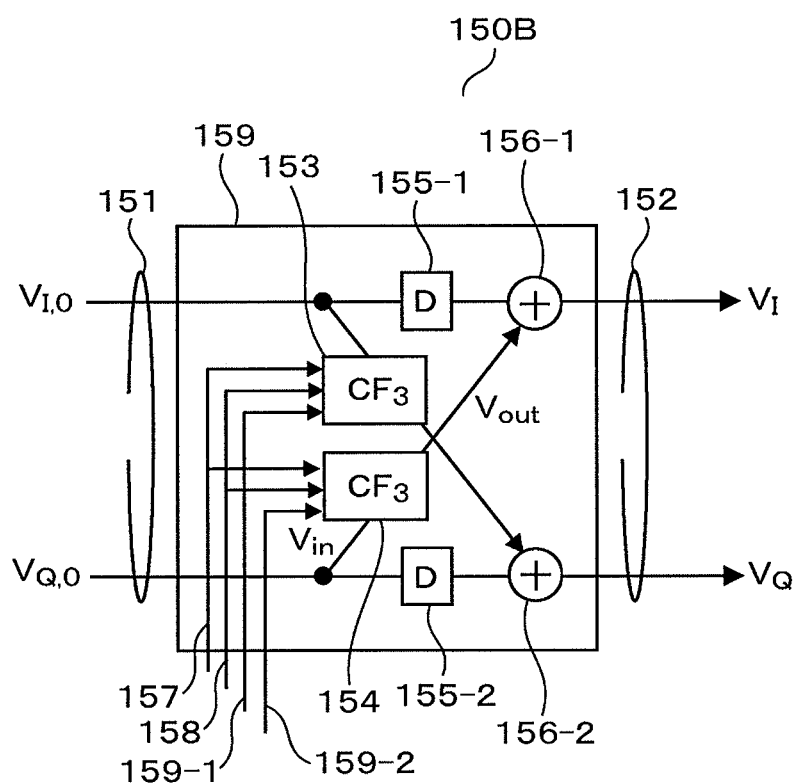

OPTICAL MULTILEVEL TRANSMITTER AND OPTICAL TRANSPONDER

CLAIM OF PRIORITY

The present application claims priority from Japanese patent application serial no. 2013-226987, filed on Oct. 31, 2013, the content of which is hereby incorporated by reference into this application.

BACKGROUND ART

The present invention relates to an optical multilevel transmitter which includes a semiconductor quadrature optical modulator for converting an electric signal into an optical signal, and an optical transponder. In particular, the invention relates to an optical multilevel transmitter which includes a semiconductor nonlinear characteristic compensation circuit, and an optical transponder.

Increased use of massive amounts of content such as high-resolution images and explosive use of mobile terminals typified by smartphones have considerably increased Internet traffic. Accordingly, optical communication systems are required to have much larger capacities.

In addition to technologies such as modulation speedup and wavelength multiplexing, there have been developed technologies in recent years that make optical signals multilevel to use frequencies more efficiently. Making optical signals multilevel (hereafter referred to as optical multilevel modulation) is a modulation technology that simultaneously transmits multiple bits of information using a single-symbol optical signal by superimposing phase and polarization information on the optical signal.

Many optical multilevel modulation techniques have been disclosed. R. A. Griffin, et al., "10 Gb/s Optical Differential Quadrature Phase Shift Key (DQPSK) Transmission using GaAs/AlGaAs Integration," OFC2002, paper PD-FD6, 2002 discloses quadrature phase shift keying (QPSK). P. J. Winzer, "Spectrally Efficient Long-Haul Optical Networking Using 112-Gb/s Polarization-Multiplexed 16-QAM," JOURNAL OF LIGHTWAVE TECHNOLOGY, VOL. 28, NO. 4, Feb. 15, 2010, pp. 547-556 discloses a 16-QAM signal coherent reception technique involving polarization multiplexing.

FIGS. 1A to 1D are diagrams showing complex phase planes used in optical transmission and signal constellations according to known modulation techniques. In FIGS. 1A to 1D, the points of optical multilevel signals are plotted on a complex phase plane (also called a complex plane, phase plane, or IQ plane) (complex representation of an optical electric field at an identified time).

FIG. 1A shows signal points on an IQ plane. In FIG. 1A, each signal point can be represented by complex rectangular coordinates (IQ coordinates) or polar coordinates consisting of amplitude $r(n)$ and phase $\phi(n)$.

FIG. 1B shows quadrature phase shift keying (QPSK), by which 2-bit information (00, 01, 11, 10) is transmitted using a single symbol and using four values (0, $\pi/2$, $\pi$, $-\pi/2$) as phase angles $\phi(n)$. FIG. 1C shows 16-quadrature amplitude modulation (16-QAM), which is widely used in wireless communications. In 16-QAM, signal points are arranged in a lattice pattern, and 4-bit information can be transmitted using a single symbol.

FIG. 1D shows 64-QAM signals. In 64-QAM, 6-bit information can be transmitted using a single symbol. On the other hand, a great number of signal points are arranged very densely and therefore performance such as reception sensitivity tends to degrade due to displacement of the signal points, or the like.

Not only optical multilevel modulation techniques but also optical modulators for transmitting optical multilevel signals have been considered in recent years. Current optical multilevel transmitters mostly use a lithium niobate (LiNbO$_3$; hereafter simply referred to as LN) quadrature optical electric field modulator (hereafter referred to as IQ optical modulator). However, LN quadrature optical electric field modulators have challenges: reductions in power consumption and downsizing.

E. Yamada, et al., "112-Gb/s In PDP-QPSK modulator integrated with a silica-PLC polarization multiplexing circuit", OFC 2012, PDP5A.9, (2012) discloses a semiconductor IQ optical modulator which includes a semiconductor material in place of an LN material. This semiconductor IQ optical modulator can be integrated with a light source such as a semiconductor laser and therefore can be downsized. Further, the semiconductor IQ optical modulator can obtain changes in refraction index more efficiently than LN modulators by using the quantum-confined Stark effect of a multiple quantum well structure serving as a refraction index change mechanism which utilizes application of an electric field. Thus, it can reduce power consumption.

SUMMARY OF THE INVENTION

Preferably, even an optical multilevel transmitter using a semiconductor IQ optical modulator obtains reception sensitivity characteristics similar to those of traditional optical multilevel transmitters using an LN-IQ optical modulator.

Accordingly, an object of the present invention is to provide an optical multilevel transmitter that uses a semiconductor IQ optical modulator and that is small in size, low in power consumption, and excellent in reception sensitivity characteristics.

An optical multilevel transmitter of an aspect of the present invention includes a semiconductor quadrature optical modulator configured to separately modulate and output in-phase and quadrature electric field components and a semiconductor nonlinear characteristic compensation circuit configured to generate, from in-phase and quadrature drive signals to be inputted to the semiconductor quadrature optical modulator, two compensation signals for each other and to add the two correcting signals to the corresponding drive signals.

An optical transponder of another aspect of the present invention includes an optical multilevel transmitter and an optical multilevel receiver. The optical multilevel transmitter includes a semiconductor quadrature optical modulator configured to separately modulate and output in-phase and quadrature electric field components and a semiconductor nonlinear characteristic compensation circuit configured to generate, from in-phase and quadrature drive signals to be inputted to the semiconductor quadrature optical modulator, two signals for correcting each other and to add the two correcting signals to the corresponding drive signals. The optical multilevel receiver generates an error signal on the basis of an optical multilevel transmission signal and transmits the error signal to the optical multilevel transmitter.

According to the present invention, the influence of the nonlinearity of refraction index changes of the semiconductor IQ optical modulator relative to the applied voltage or the influence of absorption loss changes thereof relative to the applied voltage is reduced. Thus, it is possible to compensate for the displacement of the signal points or increase the linearity of the transmission channel to prevent degradation of characteristics such as reception sensitivity or maximum transmission distance. Further, since multilevel modulation can be performed more accurately, it is possible to increase the number of levels to increase the information transmission speed.

BRIEF DESCRIPTION OF THE DRAWINGS

Preferred embodiments of the present invention will now be described in conjunction with the accompanying drawings, in which;

FIG. 7 is another main part block diagram of the optical multilevel transmitter;

FIG. 8 is yet another main part block diagram of the optical multilevel transmitter;

DETAILED DESCRIPTION

Figure 1A:
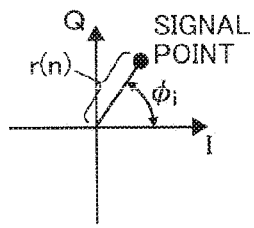
FIGS. 1A to 1D are diagrams showing optical electric field signal representation methods and optical multilevel signal constellations.
Figure 1B:
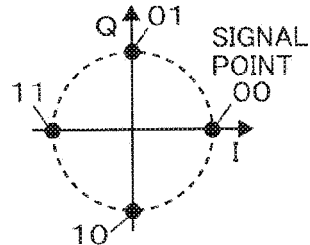
Figure 1C:
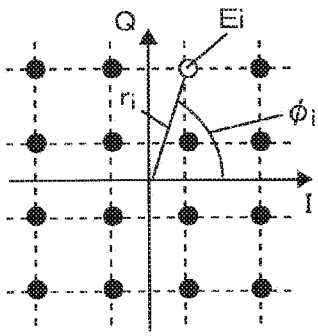
Figure 1D:
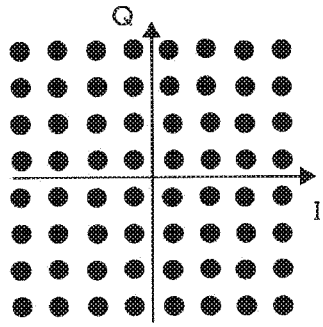
Figure 2:
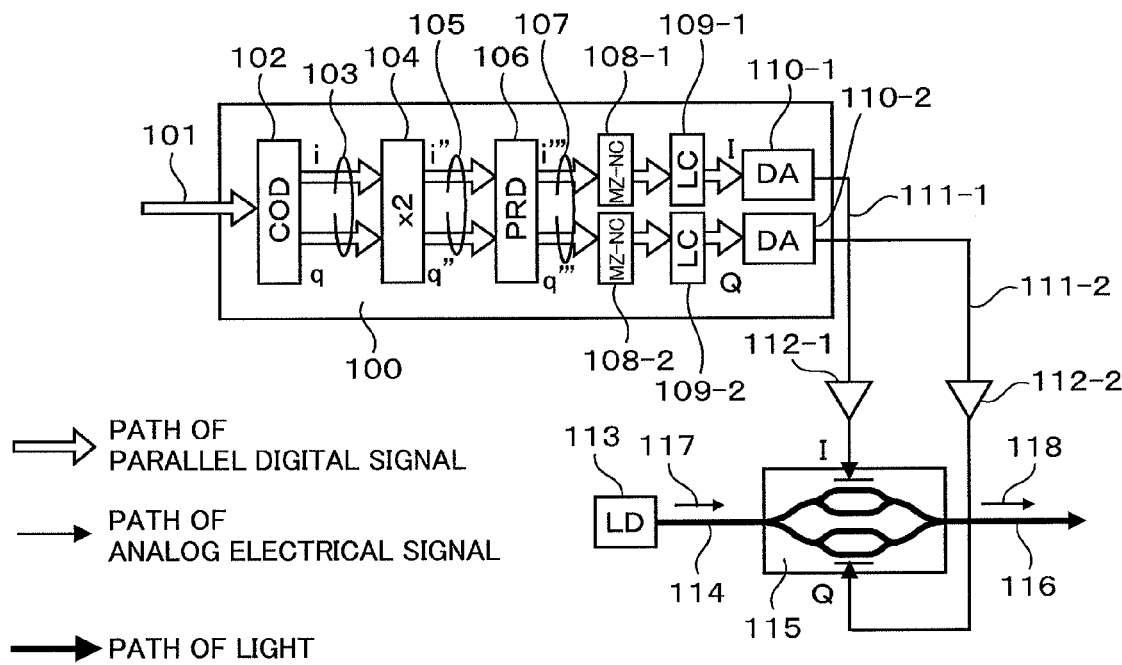
FIG. 2 is a block diagram showing the configuration of a wavelength dispersion predistortion optical multilevel transmitter.

Referring now to FIG. 2, the basic configuration of an optical multilevel transmitter will be described. In FIG. 2, the optical multilevel transmitter includes an optical multilevel transmission unit signal processing circuit 100, driver amplifiers 112, a laser light source (LD: laser diode) 113, and an IQ optical modulator 115. The optical multilevel transmission unit signal processing circuit 100 includes a multilevel coding circuit 102 (COD: coding), a double interpolation circuit (×2: times 2) 104, a predistortion circuit (PRD: predistortion) 106, modulator nonlinear response compensation circuits (MZ-NC: Mach-Zehnder nonlinear compensation) 108, linear response compensation circuits (LC: linear compensation) 109, and DA converters (DA: digital/analog) 110. The IQ optical modulator 115 includes two types (I: in-phase, Q: quadrature-phase) of Mach-Zehnder optical modulators (hereafter referred to as "MZ modulators"). Each MZ optical modulator has two arms.

In the optical multilevel transmission unit signal processing circuit 100 shown in FIG. 2, the multilevel coding circuit 102 converts an inputted information signal 101 into a multilevel symbol sequence 103 which is digitally represented on an IQ plane. The double interpolation circuit 104 performs oversampling at 2 samples/symbol to convert the multilevel symbol sequence 103 into a multilevel signal sequence 105. The predistortion circuit 106 compensates for (predistorts) the influence of the wavelength dispersion of the optical fiber on the transmission side. The modulator nonlinear response compensation circuits 108 and linear response compensation circuits 109 compensate for the response characteristics of the real and imaginary parts of the resulting multilevel signal 107 using digital signal processing. Specifically, the modulator nonlinear response compensation circuits 108 compensate for the nonlinearity of electric field modulation performed by the MZ optical modulators having sinusoidal modulation characteristics (to be discussed later). The linear response compensation circuits 109 inversely compensate for degradation in a high band of the subsequent driver amplifiers or optical modulators or degradation of the linear response thereof, such as ripple.

The DA converters 110 convert the compensated real and imaginary parts of the digital multilevel signal into high-speed analog modulation signals 111. The driver amplifiers 112 amplify the amplitude of the analog modulation signals 111. The analog modulation signals are inputted to two modulation input terminals (in-phase (I) and quadrature-phase (Q)) of the IQ optical modulator 115. The IQ optical modulator 115 converts an unmodulated laser beam 117 outputted from the laser light source 113 into an optical multilevel signal 118 and outputs it from an output optical fiber 116.

The inventors have made optical multilevel transmitters as shown in FIG. 2. Specifically, the inventors prepare two types of optical multilevel transmitters: one including an LN-IQ optical modulator and one including a semiconductor IQ optical modulator. The inventors then generate a quadrature amplitude modulated (n-QAM) optical signal and diligently observed the modulated optical signal using a coherent optical modulation analyzer. As a result, the inventors find that the latter optical multilevel transmitter is inferior to the former in reception sensitivity performance. The inventors believe that this inferiority comes from the displacement of the points of multilevel signals generated by the semiconductor IQ optical modulator from the ideal positions thereof. Hereafter, there will be described the cause of the displacement of the signal points from the ideal positions.

Figure 3A:
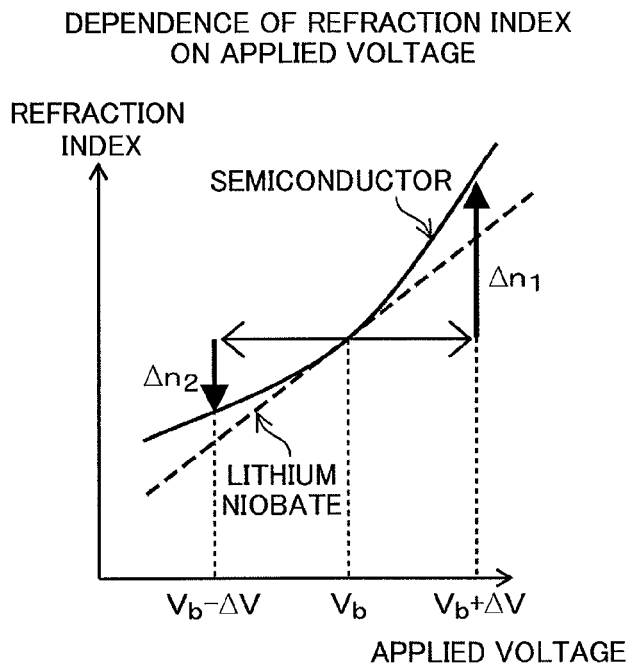
FIGS. 3A and 3B are diagrams showing the dependence of the refraction index and absorption loss of LN and semiconductor Mach-Zehnder optical modulators on the voltage.

First, referring to FIG. 3A, there will be described the dependence of the refraction index of the LN and semiconductor materials on the applied voltage. In FIG. 3A, the refraction index of the LN material changes approximately linearly with respect to the applied voltage. The refraction index of the semiconductor material, on the other hand, changes nonlinearly. For the LN material, the magnitude of a change in refraction index when the applied voltage Vb is changed by $+\Delta V$, $|\Delta n1|$, and the magnitude of a change in refraction index when it is changed by $-\Delta V$, $|\Delta n2|$, are equal to each other. For the semiconductor material, on the other hand, $|\Delta n1|$ and $|\Delta n2|$ are not equal to each other.

Figure 3B:
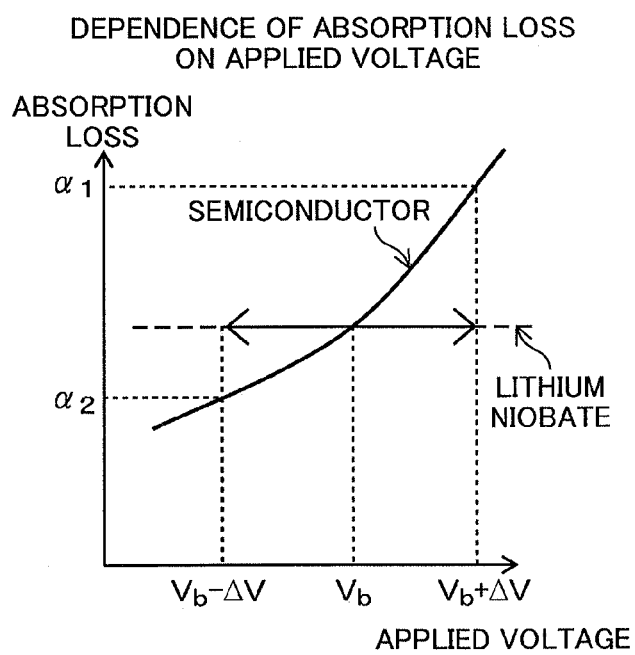

Next, referring to FIG. 3B, there will be described the dependence of the absorption loss of these materials on the applied voltage. In FIG. 3B, the absorption loss of the LN material hardly changes with respect to the applied voltage. That of the semiconductor material, on the other hand, changes to a non-negligible extent.

Figure 4A:
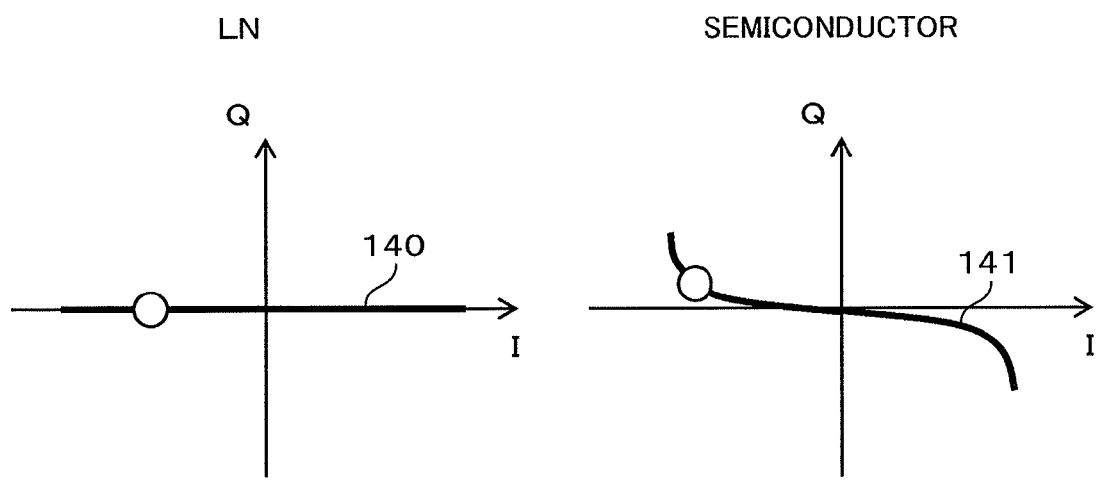
FIGS. 4A and 4B are diagrams showing phase transition trajectories and signal constellations.

Referring to FIG. 4A, there will be described the trajectories of optical electric field signals on a complex plane when an MZ optical modulator including the LN material and an MZ optical modulator including the semiconductor material are push-pull driven. In FIG. 4A, the left and right diagrams show the trajectories of optical electric field signals of the LN-MZ modulator and semiconductor MZ modulator, respectively. As described with reference to FIGS. 3A and 3B, the refraction index of the LN material changes approximately linearly with respect to the applied voltage, and the absorption loss thereof hardly changes with respect to the applied voltage. Accordingly, the two arms of the LN-MZ modulator have approximately the same amounts of refraction index and absorption loss. Thus, the trajectory of the optical electric field signal becomes approximately linear.

For the semiconductor MZ modulator, on the other hand, the two arms have different amounts of refraction index and absorption loss and therefore the trajectory of the optical electric field signal is bent in the form of S. Note that white circles in FIG. 4A represent the positions of the optical electric field signals at time t.

Figure 4B:
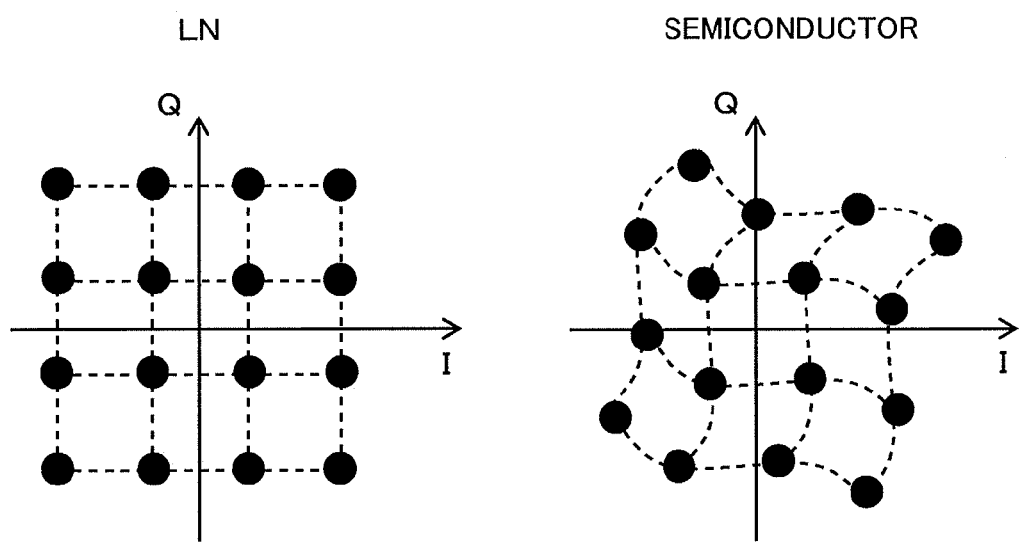

Next, referring to FIG. 4B, the position of an optical electric field on a complex plane (signal constellation) will be described. This optical electric field is obtained by separately modulating in-phase-component and quadrature-component optical electric fields using an IQ optical modulator including two MZ modulators and then combining the resulting optical electric fields. In FIG. 4B, the left diagram shows the signal constellation of the LN-IQ optical modulator; the right diagram shows the signal constellation of the semiconductor IQ optical modulator.

In the constellation of signals modulated by the LN-IQ optical modulator, the signal points are regularly arranged on straight lines since the trajectory of the optical electric field signal is approximately linear.

In the constellation of signals modulated by the semiconductor IQ optical modulator, on the other hand, the signal points are arranged on curves since the trajectory of the optical electric field signal is bent in the form of S. That is, the points of signals modulated by the semiconductor IQ optical modulator are displaced from the ideal positions, which are arranged on straight lines.

As seen above, the causes of the displacement of the signal points from the ideal positions are that (1) the refraction index of the semiconductor material changes nonlinearly with respect to the applied voltage and that (2) the absorption loss thereof changes with respect to the applied voltage. That is, the displacement is caused by physical properties specific to the semiconductor material.

However, the cause of the displacement of the signal points is not limited to the physical properties specific of the material and, in practice, errors in the manufacture of optical devices can also cause such displacement. The manufacturing process of semiconductor IQ optical modulators is complicated compared to that of LN-IQ optical modulators and is therefore difficult to control. This also makes the displacement of the signal points likely to occur.

Hereinafter, the optical multilevel transmitter will be described in detail. Note that these diagrams are only illustrative of the present embodiment and the elements in the diagrams are not necessarily scaled correctly.

First Embodiment

A first embodiment will be described with reference to FIGS. 5 to 7.

First, referring to FIG. 5, the configuration of an optical multilevel transmitter of the first embodiment will be described. In FIG. 5, an optical multilevel transmitter 300 includes a multilevel transmission unit signal processing circuit 190, driver amplifiers 112, a laser light source 113, and an IQ optical modulator 115. The multilevel transmission unit signal processing circuit 190 includes a multilevel coding circuit 102, a double interpolation circuit 104, a predistortion circuit 106, a semiconductor nonlinear characteristic compensation circuit (Semi-NC: semiconductor nonlinear compensation) 150, modulator nonlinear response compensation circuits 108, linear response compensation circuits 109, and DA converters 110. The IQ optical modulator 115 includes two types (in-phase (I) and quadrature-phase (Q)) of MZ optical modulators. Each MZ optical modulator has two arms.

Figure 5:
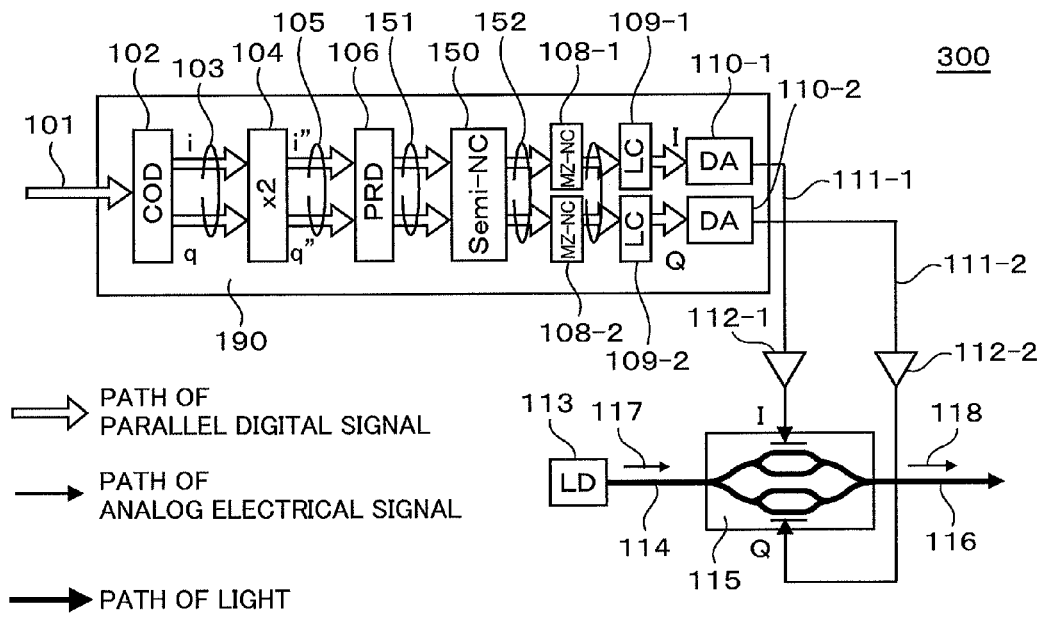
FIG. 5 is a block diagram of an optical multilevel transmitter.

In FIG. 5, the multilevel transmission unit signal processing circuit 190 has a configuration where the semiconductor nonlinear characteristic compensation circuit 150 is added to the optical multilevel transmission unit signal processing circuit 100 shown in FIG. 2. The semiconductor nonlinear characteristic compensation circuit 150 is a circuit that compensates for nonlinear transformation caused by the interference of output light of the IQ optical modulator 115 resulting from nonlinear changes in refraction index and changes in absorption loss of a semiconductor material. The semiconductor nonlinear characteristic compensation circuit 150 is disposed in a stage following the predistortion circuit 106 and preceding the modulator nonlinear response compensation circuits 108. This is because the compensation circuits disposed on the transmission side aim to sequentially compensate for preceding transmission degradation, starting with the DA converters 110, to linearize and undistort the transmission path. Specifically, the linear response compensation circuits 109, disposed in the stage preceding the DA converters 110, compensate for response degradation caused by the DA converters and the following driver amplifiers and optical modulator electrode. The modulator nonlinear response compensation circuits 108, disposed in the stage preceding the linear response compensation circuits 109, linearizes sinusoidal amplitude modulation characteristics caused by optical interference in the two MZ modulators disposed in the IQ optical modulator 115. Since nonlinear changes in refraction index and changes in absorption loss to be compensated for affect the arrangement of multilevel signals when I modulation components and Q components are combined later, the configuration of FIG. 5 is desirable. Note that the predistortion circuit 106, modulator nonlinear response compensation circuits 108, and linear response compensation circuits 109 shown in FIG. 5 are not necessarily required and may be omitted. Further, the multilevel transmission unit signal processing circuit 190 may include an additional compensation circuit.

The semiconductor nonlinear characteristic compensation circuit 150 is a two-input, two-output function having an input two-dimensional complex digital signal 151 as an input variable and having an output complex digital signal 152 as an output variable. When a voltage is applied to the IQ optical modulator 115, the signal constellation is distorted by the influence of nonlinear changes in refraction index and changes in absorption loss. The characteristics of the semiconductor nonlinear characteristic compensation circuit 150 can be represented by a signal constellation transformation function (inverse function) which compensates for such distortion in advance.

Since the two MZ optical modulators in the IQ optical modulator 115 modulate an optical electric field in parallel with the I and Q axes, the signal points are regularly arranged in a lattice pattern, as shown in the left diagram of FIG. 4B. However, if nonlinear changes in refraction index and changes in absorption loss of the semiconductor material (hereafter referred to as semiconductor nonlinear characteristics) have a non-negligible influence, the optical electric field would be modulated in a distorted manner which is unparallel with the I and Q axes. Consequently, the signal points would be displaced from the ideal positions forming a lattice pattern as shown in the right diagram of FIG. 4B.

The relationship between the coordinates of an ideal signal point (I, Q)in and the coordinates of a displaced, actual signal point (I, Q)out can be represented by (I, Q)out=F((I, Q)in) where F( ) represents a coordinate transformation function of 1:1. With respect to such a 1:1 coordinate transformation function, an inverse function like F^-1( ) always exists. Accordingly, if the semiconductor nonlinear characteristic compensation circuit 150 previously transforms the voltage value of an input signal point, (VI, VQ)in, into the voltage value of an output signal point, (VI, VQ)out=F^-1((VI, VQ)in), it is possible to compensate for the influence of changes in signal constellation made by the IQ optical modulator 115, that is, the influence of the semiconductor nonlinear characteristics. Note that "I" and "Q" of VI and VQ are subscripts and "^" represents exponentiation to make it easier to read the text of the specification.

Hereafter, there will be described derivation of an inverse function F^-1( ) using a formula and then the specific configuration of the semiconductor nonlinear characteristic compensation circuit 150. The MZ optical modulators included in the IQ optical modulator 115 are optical devices which modulate the phase and intensity of light by dividing unmodulated light inputted from the input optical waveguide, passing the resulting propagation light rays through two waveguides, making a phase difference between the propagation light rays, and then combining the resulting light rays. Typically, an MZ optical modulator is driven (push-pull driven) by making a phase difference π between light rays propagating through two waveguides and then applying voltage signals having the same magnitude and different signs to the respective waveguides. The optical electric fields propagating through the two waveguides can be represented by Formula 1 below.

$$\begin{cases} E_+ = \exp\left(j\left(\phi(V) - \frac{\pi}{2}\right)\right) \\ E_- = \exp\left(j\left(-\phi(V) + \frac{\pi}{2}\right)\right) \end{cases} \quad \text{[Formula 1]}$$

Formula 1 is a formula which holds true only when changes in refraction index caused by the applied voltage are linear and when absorption loss does not depend on the applied voltage. Accordingly, Formula 1 is not applicable to semiconductor optical modulators. When the refraction index is proportional to the square of the applied voltage and when the absorption loss is proportional to the applied voltage, the optical electric field can be represented by Formula 2 below.

$$\begin{cases} E_+ = (1-aV)\exp\left(j\left(\pi V + bV^2 - \frac{\pi}{2}\right)\right) \\ E_- = (1+aV)\exp\left(j\left(-\pi V + bV^2 + \frac{\pi}{2}\right)\right) \end{cases} \quad \text{[Formula 2]}$$

where V represents a voltage standardized by a modulation voltage π; and a and b represent an absorption coefficient and a constant about changes in refraction index, respectively. The composite electric field (output optical electric field signal) of the respective optical electric fields can be represented by Formula 3 below.

$$E_I = E_{I+} + E_{I-} \quad \text{[Formula 3]}$$
$$= (1-aV_I)(\sin(\pi V_I + bV_I^2) - j\cos(\pi V_I + bV_I^2)) +$$
$$(1+aV_I)(\sin(\pi V_I - bV_I^2) + j\cos(\pi V_I - bV_I^2))$$

Similarly, the quadrature signal can be represented by Formula 4 below.

$$E_Q = j(E_{Q+} + E_{Q-}) \quad \text{[Formula 4]}$$
$$= j(1-aV_Q)(\sin(\pi V_Q + bV_Q^2) -$$
$$j\cos(\pi V_Q + bV_Q^2)) + j(1+aV_Q)$$
$$(\sin(\pi V_Q - bV_Q^2) + j\cos(\pi V_Q - bV_Q^2))$$

Accordingly, when semiconductor nonlinear characteristics are considered, the in-phase component (real part) EI' of the output optical electric field signal can be represented by Formula 5 below.

$$E_I' = \text{real}(E_I + E_Q) \quad \text{[Formula 5]}$$
$$= (1-aV_I)\sin(\pi V_I + bV_I^2) +$$
$$(1+aV_I)\sin(\pi V_I - bV_I^2) +$$
$$(1-aV_Q)\cos(\pi V_Q + bV_Q^2) -$$
$$(1+aV_Q)\cos(\pi V_Q - bV_Q^2)$$

When a is 0 and b is 0 in Formula 5, an ideal signal constellation is obtained. That is, an ideal output optical electric field signal EI0' is represented by Formula 6 below.

$$E_{I0}' = 2\sin(\pi V_{I0}) \quad \text{[Formula 6]}$$

Correcting the signal constellation only requires satisfying Formula 7 below.

$$2\sin(\pi V_{I0}) = \quad \text{[Formula 7]}$$
$$(1-aV_I)\sin(\pi V_I + bV_I^2) + (1+aV_I)\sin(\pi V_I - bV_I^2) +$$
$$(1-aV_Q)\cos(\pi V_Q + bV_Q^2) - (1+aV_Q)\cos(\pi V_Q - bV_Q^2)$$

If the MZ optical modulators are used in an area where the electric field modulation characteristics are approximately linear, an approximation sin(x)=x is possible. By using this approximation, Formula 7 can be developed as follows.

$$2\pi V_{I0} = 2\pi V_I - 2abV_I^3 - 2\pi bV_Q^3 - 2aV_Q\cos(\pi V_Q)\cos(bV_Q^2) \quad \text{[Formula 8]}$$

If a<<1, b<π, and VI<1 are considered, then 2πVI>>2abVI^3. Accordingly, 2abVI^3 can be ignored. Thus, the corrected I phase voltage can be represented by Formula 9 below.

$$V_I = V_{I0} + bV_Q^3 + \frac{a}{\pi}V_Q\cos(\pi V_Q)\cos(bV_Q^2) \quad \text{[Formula 9]}$$

The terms other than VI0 and VQ on the right side of Formula 9 are constants. It is understood that the second term and later correction terms are calculated from only VQ. Further, if the second term and later correction terms are sufficiently smaller than the first term, even when VQ is a yet-to-be-corrected voltage value VQ0, the result hardly changes. In this way, VI is derived. Similarly, VQ can be derived. In summary, if VI and VQ satisfy Formula 10 below, the semiconductor nonlinear characteristics can be compensated for.

$$\begin{cases} V_I = V_{I0} + bV_{Q0}^3 + \dfrac{a}{\pi}V_{Q0}\cos(\pi V_{Q0})\cos(bV_{Q0}^2) \\ V_Q = V_{Q0} + bV_{I0}^3 + \dfrac{a}{\pi}V_{I0}\cos(\pi V_{I0})\cos(bV_{I0}^2) \end{cases} \quad \text{[Formula 10]}$$

Formula 10 shows that the displacement of the signal points can be corrected by correcting a voltage for modulating the I component and a voltage for modulating the Q component using functions depending on each other's voltage values. The intent of this formula is as follows. In modulated light, which should originally consist of one component alone, residual light of the other component occurs. This is a type of interference phenomenon. The residual light is canceled out by intentionally generating a component having a sign reverse to that of the residual light. Thus, the degradation of the signal constellation is corrected.

Typically, one of the nonlinearity of changes in refraction index and changes in absorption loss mainly causes the displacement of the signal points, and the influence of the other can be neglected. If the influence of changes in absorption loss is sufficiently small, that is, if a can be approximated to zero, Formula 10 can be represented by Formula 11, which is simpler. Similarly, if the influence of the nonlinearity of changes in refraction index is sufficiently small, that is, if b can be approximated to zero, Formula 10 can be represented by Formula 12, which is simpler.

$$\begin{cases} V_I = V_{I0} + bV_{Q0}^3 \\ V_Q = V_{Q0} + bV_{I0}^3 \end{cases} \quad \text{[Formula 11]}$$

$$\begin{cases} V_I = V_{I0} + \dfrac{a}{\pi}V_{Q0}\cos(\pi V_{Q0}) \\ V_Q = V_{Q0} + \dfrac{a}{\pi}V_{I0}\cos(\pi V_{I0}) \end{cases} \quad \text{[Formula 12]}$$

In the derivation of Formulas 11 and 12, it is assumed that the MZ optical modulators are used in an area where the electric field characteristics are approximately linear (the applied voltage is approximately 70 to 50% or less of $2V\pi$). In practice, however, this range is not limiting, and these formulas are also applicable to a case where the MZ optical modulators are used in an area where the electric field modulation characteristics are nonlinear. In this case, the nonlinearity may be compensated for using the modulator nonlinear response compensation circuit 108, disposed in the stage subsequent to the semiconductor nonlinear characteristic compensation circuit 150.

Figure 6:
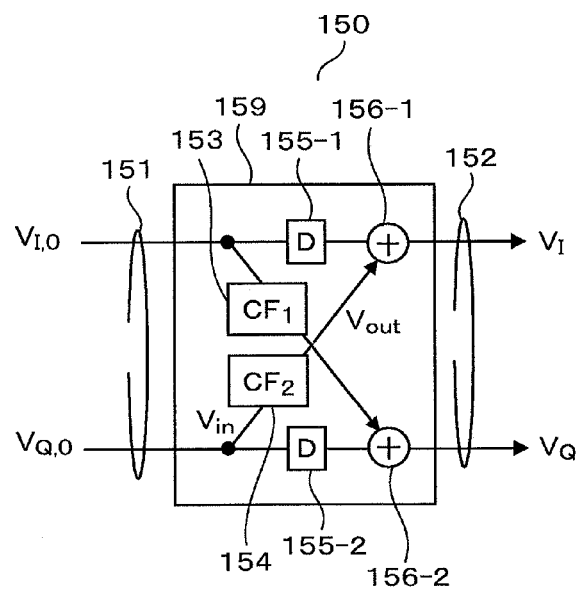
FIG. 6 is a main part block diagram of the optical multilevel transmitter.

Referring to FIG. 6, there will be described a circuit configuration for performing the calculations in Formulas 11 and 12. In FIG. 6, the semiconductor nonlinear characteristic compensation circuit 150 includes a Q component compensation amount calculation circuit (CF: compensation function) 153, an I component compensation amount calculation circuit 154, delay circuits (D: delay) 155 (155-1, 155-2), and addition circuits 156 (156-1, 156-2). In FIG. 6, the input complex digital signal 151 includes two components: an in-phase component (VI0) and a quadrature component (VQ0). The semiconductor nonlinear characteristic compensation circuit 150 divides the in-phase component (VI0) into two signals, inputs one of the two signals to the delay circuit 155-1, and inputs the other signal to the Q component compensation amount calculation circuit 153 and uses it as a Q component compensation signal.

The semiconductor nonlinear characteristic compensation circuit 150 also divides the quadrature component (VQ0) into two signals, inputs one of the two signals to the delay circuit 155-2, and inputs the other signal to the I component compensation amount calculation circuit 154 and uses it as an I component compensation signal. The semiconductor nonlinear characteristic compensation circuit 150 then adds the compensation signals to the original input signals delayed by the delay circuits 155 in the addition circuits 156 to generate output signals. Note that the compensation amount calculation circuits 153 and 154 perform calculations of the second and later terms on the right side of one of Formulas 11 and 12. A coefficient used to calculate the amount of compensation may be extracted from the evaluation result of the optical device and implemented in the circuit in advance. Where digital signal processing is used, the semiconductor nonlinear characteristic compensation circuit 150 can be easily realized by using a lookup table or function approximation method. The semiconductor nonlinear characteristic compensation circuit 150 can also be realized by directly calculating a high-frequency analog signal. Note that in the present specification, a single semiconductor nonlinear characteristic compensation circuit 150 is described as a semiconductor nonlinear characteristic compensation circuit 159.

Referring to FIG. 7, another semiconductor nonlinear characteristic compensation circuit 150A will be described. The semiconductor nonlinear characteristic compensation circuit 159, which is useful when the compensation terms are sufficiently smaller than the original input signal, has been described above with reference to FIG. 6. In contrast, if the correction terms are larger than the original input signal to a non-negligible extent, multiple semiconductor nonlinear characteristic compensation circuits 159 may be couple together, as shown in FIG. 7. In FIG. 7, a semiconductor nonlinear characteristic compensation circuit 150A is formed by coupling three semiconductor nonlinear characteristic compensation circuits 159 together. However, the number of semiconductor nonlinear characteristic compensation circuits 159 included in the semiconductor nonlinear characteristic compensation circuit 150A is not limited to three and may be set to an appropriate number on the basis of the allowable circuit size and the required compensation accuracy.

Second Embodiment

In the first embodiment, there has been described the nonlinear characteristic compensation circuit which incorporates the amount of compensation corresponding to an input signal based on a lookup table in advance and which can be implemented quickly and by a simple method. In the second embodiment, there will be described a high-accuracy compensation circuit which is highly resistant to characteristic variations among the implemented optical elements, changes in temperature, or the like.

Referring now to FIG. 8, there will be described the configuration of a semiconductor nonlinear characteristic compensation circuit 150B of the second embodiment. In FIG. 8, the semiconductor nonlinear characteristic compensation circuit 150B includes delay circuits 155 (155-1, 155-2), adders 156 (156-1, 156-2), a Q component compensation amount calculation circuit 153, and an I component compensation amount calculation circuit 154.

In FIG. 8, an input complex digital signal 151 is divided into two components: an in-phase component (VI0) and a quadrature component (VQ0), which are then inputted to the semiconductor nonlinear characteristic compensation circuit 150B. The in-phase component (VI0) is divided into two signals; one of the two signals is inputted to the delay circuit 155-1; and the other signal is inputted to the Q component compensation amount calculation circuit 153 and used as a Q component compensation signal.

The quadrature component (VQ0) is also divided into two signals; one of the two signals is inputted to the delay circuit 155-2; and the other signal is inputted to the I component compensation amount calculation circuit 154 and used as an I component compensation signal.

The compensation signals are added to the original input signals in the adders 156-1 and 156-2 to generate output signals. Note that the Q component compensation amount calculation circuit 153 and I component compensation amount calculation circuit 154 are configured to receive compensation coefficients a, b of Formula 11 and n modulation voltages $V\pi I$, $V\pi Q$ of the I and Q phases from outside. Such a configuration allows optimum parameters to be set for each of the implemented optical elements. Thus, more accurate compensation can be made. Note that the number of input parameters for compensation is not limited to four. If the influence of changes in absorption loss is sufficiently smaller than that of the nonlinearity of changes in refraction index, the number of input parameters may be three, since the compensation coefficient a can be approximated to zero. Preferably, the Q component compensation amount calculation circuit 153 and I component compensation amount calculation circuit 154 are designed appropriately based on the allowable circuit size and the required compensation accuracy.

While the values of these parameters may be always constant when the optical transmitter is being driven, they may also be changed as appropriate.

Figure 9:
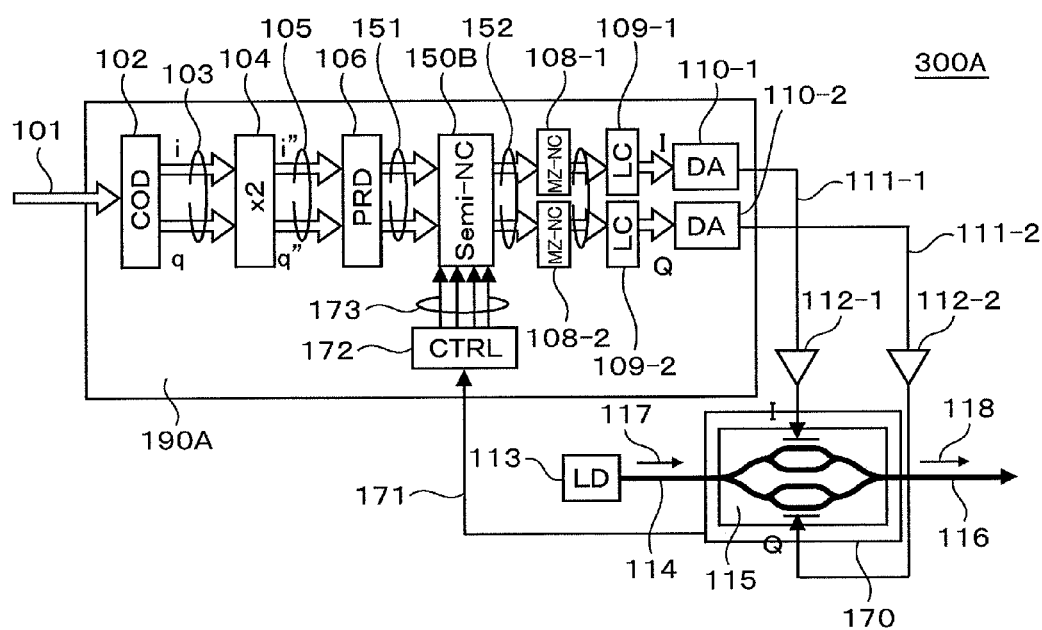
FIG. 9 is a block diagram of an optical multilevel transmitter.

Referring to FIG. 9, there will be described an optical multilevel transmitter 300A which can change parameters while depending on the temperature of an IQ optical modulator. In FIG. 9, the optical multilevel transmitter 300A includes a multilevel transmission unit signal processing circuit 190A, driver amplifiers 112, a laser light source 113, and an IQ optical modulator 115. The multilevel transmission unit signal processing circuit 190A is formed by adding a four-variable minimum control circuit (CTRL: control) 172 to the multilevel transmission unit signal processing circuit 190 of FIG. 6 and replacing the semiconductor nonlinear characteristic compensation circuit 150 of FIG. 6 with the semiconductor nonlinear characteristic compensation circuit 150B of FIG. 8. The IQ optical modulator 115 is placed on a temperature controller 170.

The temperature controller 170 outputs a temperature signal 171 to the four-variable minimum control circuit 172. The four-variable minimum control circuit 172 generates an optimum compensation amount control signal 173 on the basis of the temperature signal 171 and outputs it to the semiconductor nonlinear characteristic compensation circuit 150B. The semiconductor nonlinear characteristic compensation circuit 150B compensates for the semiconductor nonlinear characteristics on the basis of the compensation amount control signal 173. By using such a configuration, even when the temperature of the optical transmitter changes while the optical transmitter is driven, the compensation coefficients are automatically corrected in a manner following the temperature change. Thus, more accurate, more stable compensation can be made. While the configuration where the temperature is monitored has been described above, other configurations may be used. For example, there may be used a configuration where the wavelength and optical output intensity are monitored so that the compensation coefficients are corrected as appropriate. Further, not only the IQ optical modulator 115 but also the semiconductor laser 113 may be placed on the temperature controller 170.

Third Embodiment

Figure 10:
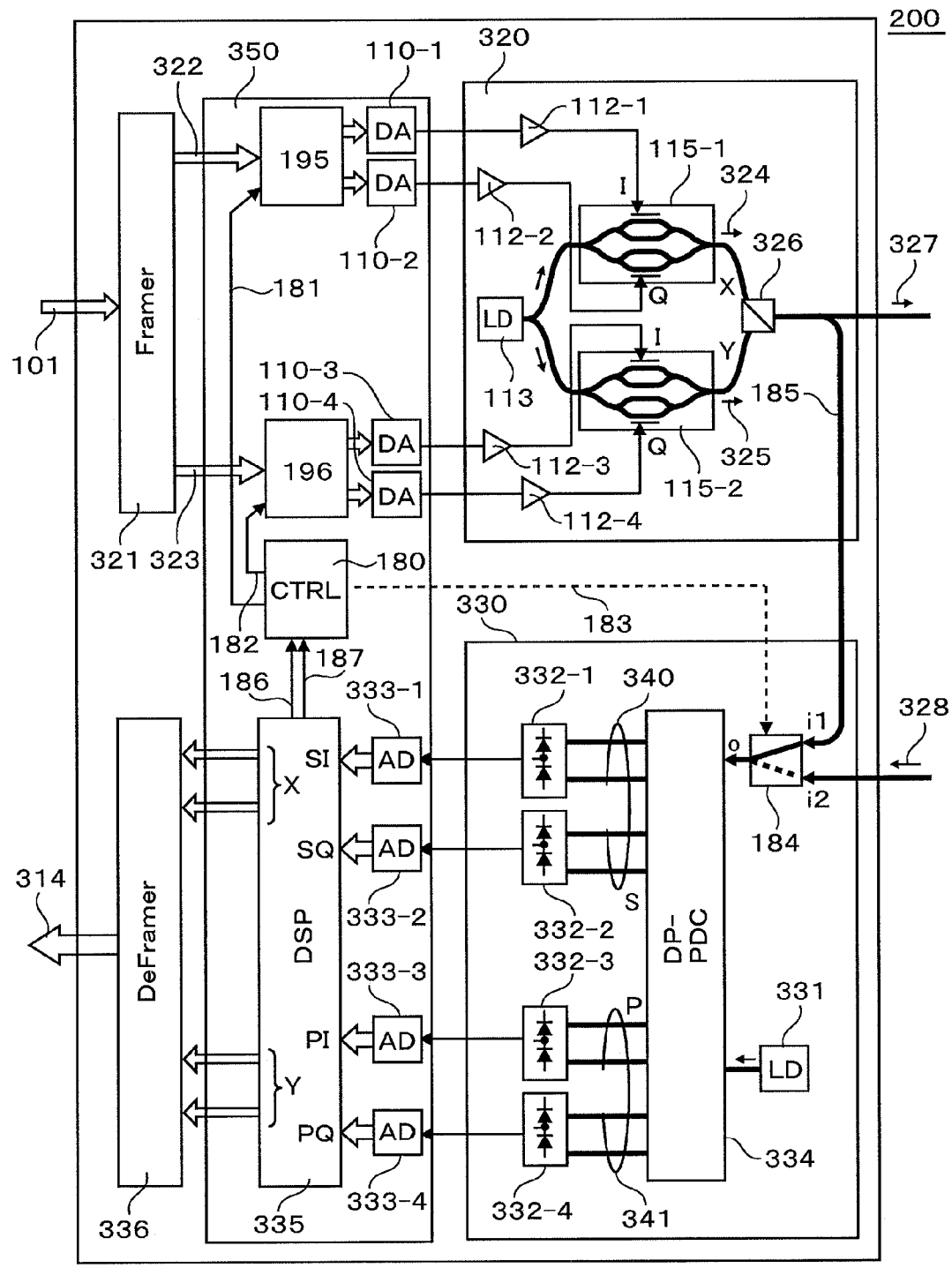
FIG. 10 is a block diagram of an optical transponder.

Referring to FIG. 10, there will be described the configuration of an optical multilevel transceiver (transponder) of a third embodiment. While a repeater such as a frequency converter is called a transponder in telecommunications or wireless communications, an optical transceiver having functions of multiplexing and demultiplexing electric signals is called an optical transponder in optical communications.

In FIG. 10, an optical transponder 200 includes a framer 321, a transmission/reception signal processing unit (IC) 350, a polarization multiplexed optical signal transmitter 320, a polarization diversity coherent optical receiver 330, and a deframer 336. The transmission/reception signal processing unit 350 includes an x-polarized component transmission signal processing unit 195, a y-polarized component transmission signal processing unit 196, DA converters 110, a semiconductor nonlinear characteristic compensation control circuit 180, AD converters 333, and a reception signal processing unit 335. The polarization multiplexed optical signal transmitter 320 includes a laser light source 113, driver amplifiers 112, a quadrature optical electric field modulator (IQ optical modulator) 115, and a polarization multiplexer 326. The polarization diversity coherent optical receiver 330 includes an optical switch 184, a local laser light source 331, a polarization division/90-degree optical hybrid circuit (DP-PDC: dual polarization-polarization division circuit) 334, and balanced photodetectors 332.

In the third embodiment, the coherent optical multilevel receiver included in the optical multilevel transceiver is used to compensate for semiconductor nonlinear characteristics. In FIG. 10, part of a polarization multiplexed transmission optical multilevel signal 327 passes through a monitoring optical signal path 185 and is then inputted to the polarization diversity coherent optical receiver 330. The optical switch 184 disposed in the input section of the receiver makes a selection as to which of the part of the polarization multiplexed transmission optical multilevel signal 327 and a normal polarization multiplex reception optical multilevel signal 328 is to be inputted to the polarization division/90-degree optical hybrid circuit 334.

The framer 321 receives an information signal 101 inputted to the optical transponder 200 and generates an x-polarized information signal 322 and a y-polarized information signal 323. The x-polarized component transmission signal processing unit 195 and y-polarized component transmission signal processing unit 196 receive and process the information signals 322 and 323, respectively. The transmission signal processing unit 195 includes the semiconductor nonlinear characteristic compensation circuit 150 and corrects the output signal on the basis of an inputted x-polarized component compensation amount control signal 181. Similarly, the transmission signal processing unit 196 includes the semiconductor nonlinear characteristic compensation circuit 150 and corrects the output signal on the basis of an inputted y-polarized component compensation amount control signal 182. In addition to the semiconductor nonlinear characteristic compensation circuit 150, the transmission signal processing units 195 and 196 may each include the multilevel coding circuit 102, double interpolation circuit 104, predistortion circuit 106, modulator nonlinear response compensation circuit 108, linear response compensation circuit 109, or the like described in FIG. 2.

The DA converters 110 receive the complex digital signals from the transmission signal processing units 195 and 196 and convert them into analog signals. The driver amplifiers 112 amplify the analog signals outputted from the DA converters 110 to the desired size. The IQ modulators 115-1 and 115-2 receive the amplified analog signals and also receive continuous light (unmodulated light having constant intensity) from the LD 113. The IQ modulator 115-1 then outputs an x-polarized optical multilevel signal 324. The IQ modulator 115-2 outputs a y-polarized optical multilevel signal 325.

The polarization multiplexer 326 combines the optical multilevel signals from the IQ optical modulators 115 into a polarization multiplexed transmission optical multilevel signal 327. As described above, part of the polarization multiplexed transmission optical multilevel signal 327 passes through the monitoring optical signal path 185 and is then inputted to the optical switch 184, disposed in the polarization diversity coherent optical receiver 330. The residual polarization multiplexed transmission optical multilevel signal 327 is transmitted from the optical transponder 200. The transmitter configuration of the optical transponder 200 has been described above.

The receiver configuration of the optical transponder 200 is described below. The optical switch 184 receives a polarization multiplexed reception optical multilevel signal 328 received by the optical transponder 200. Based on an optical switch selection signal 183 outputted from the semiconductor nonlinear characteristic compensation control circuit 180, the optical switch 184 makes a selection as to which of the polarization multiplexed reception optical multilevel signal 328 and part of a polarization multiplexed transmission optical multilevel signal 327 is to be outputted. The polarization division/90-degree optical hybrid circuit 334 receives the optical multilevel signal from the optical switch 184 and divides it into two quadrature polarized components (s-polarized component and p-polarized component). The polarization division/90-degree optical hybrid circuit 334 also changes the ratio at which the polarized components are outputted to four output ports, on the basis of the phase of the received optical multilevel signal. The phase of the optical multilevel signal is detected using an interference phenomenon between the optical multilevel signal and a laser beam having approximately the same wavelength. In order to implement that, the polarization division/90-degree optical hybrid circuit 334 receives continuous light from the local laser light source (LD) 331.

The four balanced photodetectors 332 receive four s-polarized components 340 and four p-polarized components 341 divided by the polarization division/90-degree optical hybrid circuit 334 and convert these optical signals into electric signals. The AD converters 333 receive the electric signals and convert them into digital signals. The reception signal processing unit 335 separates polarized components from the digital signals, demodulates the separated polarized components into the original x- and y-polarized information signals, and outputs them. The deframer 336 separates frames from the x- and y-polarized information signals and outputs the resulting signals as information signals 314 from the optical transponder 200. Note that the reception signal processing unit 335 outputs an x-polarized component error signal 186 and a y-polarized component error signal 187 detected from errors in the signal constellation or the like to the semiconductor nonlinear characteristic compensation control circuit 180. Specifically, errors in the signal constellation are detected using the error vector magnitude (EVM) of the signal constellation of each polarized component, bit error rate, or Q value. Based on the error signals, the semiconductor nonlinear characteristic compensation control circuit 180 outputs an x-polarized component compensation amount control signal 181 and a y-polarized component compensation amount control signal 182 to the X polarization component transmission signal processing unit 195 and y-polarized component transmission signal processing unit 196, respectively.

The semiconductor nonlinear characteristic compensation control circuit 180 controls the optical switch 184 to make a selection as to which of part of a polarization multiplexed transmission optical multilevel signal 327 and a polarization multiplexed reception optical multilevel signal 328 is to be received. Only if it selects part of the polarization multiplexed transmission optical multilevel signal 327 as an optical signal to be received and will compensate for the semiconductor nonlinear characteristics, the semiconductor nonlinear characteristic compensation control circuit 180 outputs an x-polarized component compensation amount control signal 181 and a y-polarized component compensation amount control signal 182.

Note that the optical transponder 200 of the third embodiment can receive no polarization multiplexed reception optical multilevel signal 328 while it compensates for the semiconductor nonlinear characteristics. However, this inconvenience can be minimized by methods, including (1) execution of semiconductor nonlinear characteristic compensation only at start-up and (2) execution of compensation during idle time, in which polarization multiplexed reception optical multilevel signals 328 have no information to be transmitted.

The present invention is not limited to the above embodiments, and various modifications can be made thereto. Specifically, the configurations described in the above embodiments can be replaced with substantially identical configurations, configurations having identical functions and effects, or configurations capable of achieving the same object.

What is claimed is:

1. An optical multilevel transmitter comprising:
   an IQ optical modulator configured to separately modulate and output in-phase and quadrature electric field components; and
   a semiconductor nonlinear characteristic compensation circuit configured to generate, from an in-phase drive signal to modulate and output the in-phase electric field component, a first compensation signal for a quadrature drive signal to modulate and output the quadrature electric field component, and to add the first compensation signal to the quadrature drive signal, and further configured to generate, from the quadrature drive signal, a second compensation signal for the in-phase drive signal, and to add the second compensation signal to the in-phase drive signal,
   wherein a plurality of said semiconductor nonlinear characteristic compensation circuits is coupled in series.

2. The optical multilevel transmitter of claim 1, wherein the optical multilevel transmitter transmits a multilevel phase modulation signal involving amplitude modulation.

3. An optical multilevel transmitter comprising:
an IQ optical modulator configured to separately modulate and output in-phase and quadrature electric field components;
a semiconductor nonlinear characteristic compensation circuit configured to generate, from an in-phase drive signal to modulate and output the in-phase electric field component, a first compensation signal for a quadrature drive signal to modulate and output the quadrature electric field component, and to add the first compensation signal to the quadrature drive signal and further configured to generate, from the quadrature drive signal, a second compensation signal for the in-phase drive signal, and to add the second compensation signal to the in-phase drive signal;
a predistortion circuit configured to compensate for influence of wavelength dispersion of an optical fiber on a transmission side; and
a nonlinear response compensation circuit configured to compensate for nonlinearity of electric field modulation performed by MZ optical modulators having sinusoidal modulation characteristics,
wherein an output signal of said predistortion circuit is input to said semiconductor nonlinear characteristic compensation circuit, and
wherein an output signal of said semiconductor nonlinear characteristic compensation circuit is input to said nonlinear response compensation circuit.

4. The optical multilevel transmitter of claim 3, wherein the optical multilevel transmitter transmits a multilevel phase modulation signal involving amplitude modulation.

5. An optical multilevel transmitter comprising:
a semiconductor nonlinear characteristic compensation circuit including
a Q component compensation amount calculation circuit for calculating an amount of compensation of the Q component from an input complex digital signal including an in-phase field component and a quadrature electric field component;
an I component compensation amount calculation circuit for calculating an amount of compensation of the I component from an input complex digital signal including the in-phase field component and the quadrature electric field component;
a first addition circuit configured to add the in-phase field component in the input complex digital signal to the component compensation amount output from said I component compensation amount calculation circuit to generate an in-phase drive signal; and
a second addition circuit configured to add the quadrature electric field component in the input complex digital signal to the Q component compensation amount output from said Q component compensation amount calculation circuit to generate a quadrature drive signal; and
an IQ optical modulator configured to convert an unmodulated laser beam from a laser light source into an optical multilevel signal according to the in-phase drive signal and the quadrature drive signal;
a first delay circuit coupled to said first addition circuit for delaying the in-phase field component in the input complex digital signal; and
a second delay circuit coupled to said second addition circuit for delaying the quadrature electric field component in the input complex digital signal,
wherein said first addition circuit adds the in-phase field component delayed by said first delay circuit to said I component compensation amount output from said I component compensation amount calculation circuit, and
wherein said second addition circuit adds the quadrature electric field component delayed by the second delay circuit to said Q component compensation amount output from said Q component compensation amount calculation circuit.

6. The optical multilevel transmitter of claim 5, further comprising:
a predistortion circuit configured to compensate for influence of wavelength dispersion of an optical fiber on a transmission side; and
a nonlinear response compensation circuit configured to compensate for nonlinearity of electric field modulation performed by MZ optical modulators having sinusoidal modulation characteristics,
wherein an output signal of said predistortion circuit is input to said semiconductor nonlinear characteristic compensation circuit, and
wherein an output signal of said semiconductor nonlinear characteristic compensation circuit is input to said nonlinear response compensation circuit.

7. An optical multilevel transmitter comprising:
a semiconductor nonlinear characteristic compensation circuit including
a Q component compensation amount calculation circuit for calculating an amount of compensation of the Q component from an input complex digital signal including an in-phase field component and a quadrature electric field component;
an I component compensation amount calculation circuit for calculating an amount of compensation of the I component from an input complex digital signal including the in-phase field component and the quadrature electric field component;
a first addition circuit configured to add the in-phase field component in the input complex digital signal to the component compensation amount output from said component compensation amount calculation circuit to generate an in-phase drive signal; and
a second addition circuit configured to add the quadrature electric field component in the input complex digital signal to the component compensation amount output from said Q component compensation amount calculation circuit to generate a quadrature drive signal; and
an IQ optical modulator configured to convert an unmodulated laser beam from a laser light source into an optical multilevel signal according to the in-phase drive signal and the quadrature drive signal;
a predistortion circuit configured to compensate for influence of wavelength dispersion of an optical fiber on a transmission side; and
a nonlinear response compensation circuit configured to compensate for nonlinearity of electric field modulation performed by MZ optical modulators having sinusoidal modulation characteristics,
wherein an output signal of said predistortion circuit is input to said semiconductor nonlinear characteristic compensation circuit, and
wherein an output signal of said semiconductor nonlinear characteristic compensation circuit is input to said nonlinear response compensation circuit.

8. The optical multilevel transmitter of claim 7, further comprising:
   a first delay circuit coupled to said first addition circuit for delaying the in-phase field component in the input complex digital signal; and
   a second delay circuit coupled to said second addition circuit for delaying the quadrature electric field component in the input complex digital signal,
   wherein said first addition circuit adds the in-phase field component delayed by said first delay circuit to said I component compensation amount output from said I component compensation amount calculation circuit, and
   wherein said second addition circuit adds the quadrature electric field component delayed by the second delay circuit to said Q component compensation amount output from said Q component compensation amount calculation circuit.

\* \* \* \* \*